March 24, 1970     M. P. LA FLEUR     3,501,801
MEAT TENDERIZER
Filed April 24, 1967
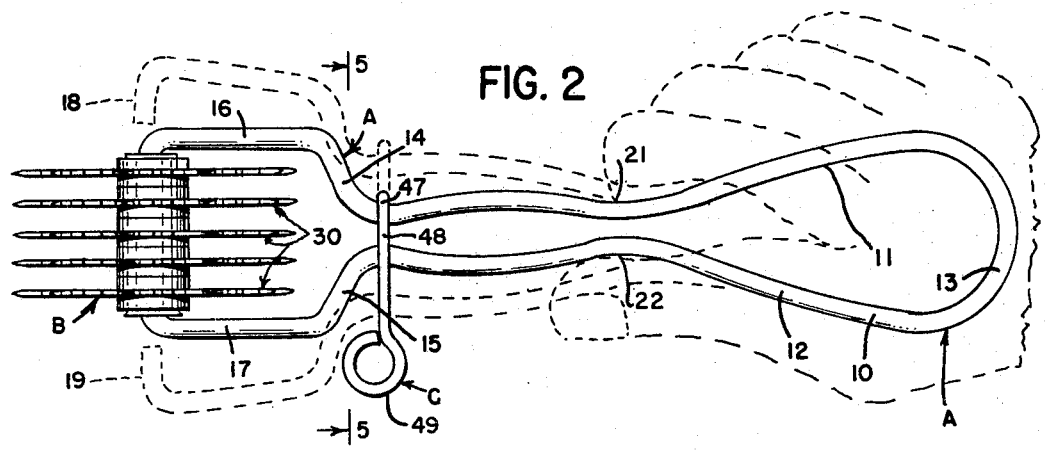
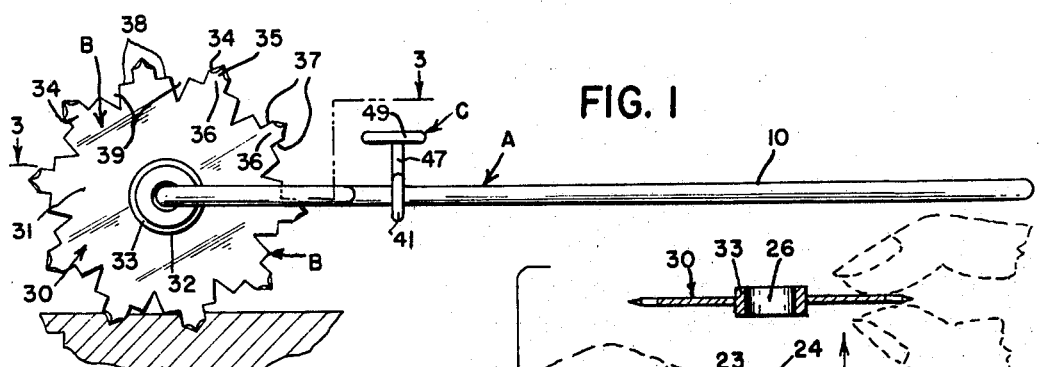
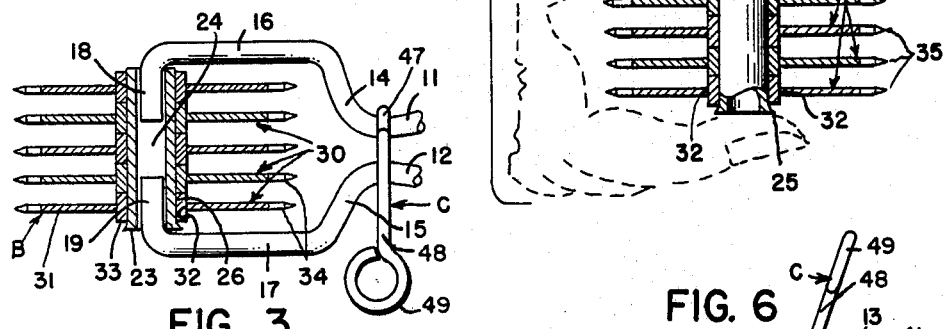
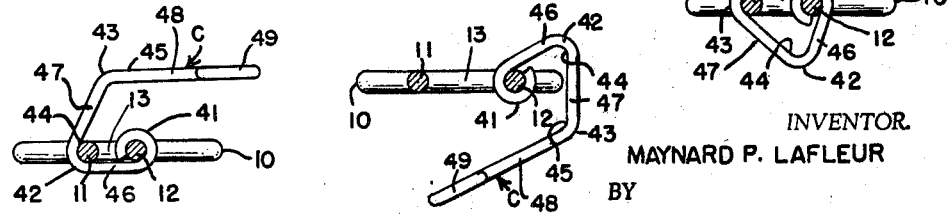
INVENTOR.
MAYNARD P. LAFLEUR
BY Caswell Lagaard & Wicks
ATTORNEYS 3,501,801
MEAT TENDERIZER
Maynard P. La Fleur, P.O. Box 457,
Champlin, Minn. 55316
Filed Apr. 24, 1967, Ser. No. 633,293
Int. Cl. A22c 9/00
U.S. Cl. 17—29                                                3 Claims

ABSTRACT OF THE DISCLOSURE

A meat tenderizer having a number of juxtaposed circular cutters formed with sharpened teeth and shoulders adjacent the teeth for holding the meat in position during cutting and limiting the depth of the cut, said cutters being carried by a sleeve rotatable on complemental axles on adjacent outwardly sprung resilient handle members movable relative to one another to permit of assembly of the cutters and sleeves thereon together with retaining means for holding the axles against the spring action thereof with the cutters assembled thereon in juxtaposed operative position, in spaced position and with the axles sufficiently spaced permitting removal of the sleeve and cutters therefrom.

FIELD OF THE INVENTION

The invention relates to meat tenderizers of the hand roll type with individually operating toothed disc like cutters.

PRIOR ART

The prior art known to applicant comprises meat tenderizers utilizing sharpened toothed cutters with either V-shaped or square shaped teeth removably mounted for rotation on the axles of a resilient wire frame formed with handle parts spring urged into operative positions such as disclosed in the patents to Black No. 559,838 and Lapham No. 189,237. Both types of teeth merely make holes in the meat when applied to the same which do not actually make the meat more tender. Such devices were difficult to take apart since the handle parts had to be sprung to disassemble the cutters from the frame.

SUMMARY OF THE INVENTION

Applicant overcame the inadequacies of the prior art structures by placing shoulders adjacent each tooth which held down the meat while the sharpened teeth made elongated cuts along the same. In addition the axles and handle members were normally disposed outwardly to permit of disassembly and a retainer employed to hold the axles in positions of use and also in position permitting spacing of the cutters while cleaning the device, as well as permitting removal of the cutters from the frame.

The invention resides in the novel combination and arrangement of parts and in the details of construction hereinafter illustrated and/or described.

SPECIFICATION

In the drawings illustrating the invention:

FIG. 1 is a side elevation of a meat tenderizer illustrating an embodiment of the invention.

FIG. 2 is a plan view of the structure shown in FIG. 1.

FIG. 3 is a fragmentaty sectional view taken on line 3—3 of FIG. 1.

FIG. 4 is a cross sectional view of the cutter assembly of the invention illustrating the method of assembling the cutters on the supporting sleeve.

FIG. 5 is a cross sectional view taken on line 5—5 of FIG. 2 and illustrating the retainer in position for normal operation of the cutters.

FIG. 6 is a view similar to FIG. 5 showing the retainer in its intermediate position and, FIG. 7 is a view similar to FIG. 5 showing the retainer in position for disassembly of the cutter assembly.

The invention comprises a frame A and on which is removably mounted a cutter assembly B. The frame A is adjustable to support the cutter B and the parts of said frame are held in adjusted position by means of a retainer C. These parts will now be described in detail.

The frame A is constructed from a length of resilient wire which is bent at its center to form a handle 10 having two spaced legs or handle members 11 and 12 and a connecting portion 13 serving as the heel of the handle. At the end of the handle is provided two outwardly extending arms 14 and 15 which have issuing from them substantially parallel offsets 16 and 17. These offsets terminate in facing substantially aligned axles 18 and 19 when the parts are in normal operative positions and fall short of one another as shown in FIG. 3. The handle members 11 and 12 are formed with bends 21 and 22 providing purchase for assisting the user in applying pressure to the device.

The cutter assembly B comprises a plurality of cutters 30 all of the same shape and construction. For this reason only the cutter 30 shown in FIG. 1 will be described. This cutter is formed from a blank of sheet metal circular in form and having a body 31 provided at its center with a circular hole 32. Pressed into this hole is a short bushing 33 having a bore 26 which bushings space the cutters from one another. At the outer periphery of the body 31 are formed a number of circularly spaced pointed teeth 34 whose outer ends 35 are V-shaped and sharpened. The inner ends 36 of these teeth have parallel edges 37 which extend up to shoulders 38 disposed one on each side of the inner ends 36. These shoulders are not sharpened and their outer edges are arranged substantially in a cylinder. The shoulders of adjoining teeth are separated by V-shaped notches 39. For supporting the various cutters a sleeve 23 is provided which has a bore 24 of a diameter to receive the axles 18 and 19 and journal the cutter assembly on said axles. The outer diameter of the sleeve is such that the sleeve can be received in the bores 26 of the bushings 33. This sleeve has a lip 25 extending outwardly therefrom at one end.

The retainer C is constructed from a length of stiff wire which is bent at one end to provide an eye 41. This eye encircles the handle member 12 at a locality adjacent the arm 15. The retainer C is further formed with two bends 42 and 43 forming angular portions 46, 47 and 48 providing inner and outer stops 44, and 45 which engage the arm 11 of handle 10 adjacent the arm 14. A finger piece 49 is formed at the end of portion 48. The portion 46 is shorter than the portion 47 so that the stop 44 holds the parts in operative positions as shown in full lines in FIG. 2 when the retainer C is in the position shown in FIG. 5. Similarly the retainer C when in the position shown in FIG. 6 stop 45 holds the assembly B with the axles 18 and 19 withdrawn partly from sleeve 23 permitting the cutters 30 to be separated for cleaning while the cutter assembly is still mounted on frame A. When the retainer C is moved to the position shown in FIG. 7 both stops 44 and 45 are free from the handle member 11 and the parts become arranged as shown in dotted lines in FIG. 2 due to the spring action of the frame. The cutter assembly B may now be removed from the frame.

The method of using the invention is as follows: The frame A is first opened up by moving retainer A to the position shown in FIG. 7. This allows the axles 18 and 19 to spring to the positons shown in FIG. 2 in dotted lines. The sleeve 23 is next held vertically with the lip 25 lowermost. The individual cutters are then threaded on the sleeve, one at a time, the first cutter resting on the lip 25. Since the cutters are symmetrical they can be turned with either side upward. When all of the cutters are in place the assembly is placed between the axles 18 and 19 and the handle portions 11 and 12 squeezed together to bring said axles into the bore 24 of sleeve 23. The retainer C is then swung about handle member 12 as an axle until the stop 44 engages handle member 11 as shown in FIG. 5. The device is then ready for use. In use the cutter assembly is rolled over the meat in several directions, the meat reversed and the operation repeated. When the meat has been sufficiently tenderized the retainer C can be moved to the position shown in FIG. 6 to permit separating the cutters and cleaning the same or moved to the position shown in FIG. 7 to disassemble the parts.

The advantages of the invention are manifest. It is not necessary in disassembling the device to spread apart the axles against spring action. The cutters can be constructed at the same cost as those of the prior art devices. By means of the retainer the spread of the axles can be controlled. The shoulders on the teeth cause the teeth cause the teeth to cut instead of pricking holes in the meat. Applicant's invention has been repeatedly tested and performs in a satisfactory manner while devices constructed in accordance with the disclosures of the two patents cited fail to perform as well as the instant invention.

Changes in the specific form of the invention, as herein described, may be made within the scope of what is claimed without departing from the spirit of the invention.

Having described the invention, what is claimed as new and desired to be protected by Letters Patent is:

1. In a meat tenderizer comprising a resilient wire frame bent to provide a U-shaped handle with spaced handle members extending outwardly from said handle members, offsets issuing from said arms, aligning axles issuing from the ends of said arms and spaced from one other, a sleeve receiving said axles and carrying spaced separate circular tooth cutters with spacers therebetween, the combination of:
   (a) a retainer constructed of wire and extending transversely of said handle members, said retainer having at one end
   (b) an eye encircling one of said handle members adjacent the arm thereof and
   (c) a finger piece at the other end thereof,
   (d) said retainer having
   (e) an inner bend and
   (f) an outer bend and forming
   (g) an inner portion between the eye and the inner bend,
   (h) an intermediate portion between the inner and outer bends and
   (i) an outer portion between the outer bend and the finger piece,
   (j) said eye, inner portion, intermediate portion and outer portion lying in a common plane transverse to the handle members and
   (k) said inner and outer bends forming inner and outer stops engagable with the other handle member,
   (l) said inner stop when engaging the other handle member holding the cutters in close position and
   (m) said outer stop when engaging the other handle member permitting separation of the cutters but holding the axles mounted in the sleeve,
   (n) said retainer when free from the other arm permitting removal of the sleeve and cutters from the axles.

2. A meat tenderizer according to claim 1 in which:
   (a) the outer portion of the retainer lies parallel to the inner portion to cause said outer portion to lie parallel to the axis of the axles when the inner stop engages the other handle member.

3. A meat tenderizer according to claim 1 in which:
   (a) the inner and intermediate portions of the retainer form an acute angle between them and
   (b) the intermediate portion and the outer portion form an obtuse angle between them.

References Cited

UNITED STATES PATENTS

| 520,173 | 5/1894 | Wagner | 17—29 |
| 559,838 | 5/1896 | Black | 17—29 |
| 776,945 | 12/1904 | Riedel | 17—29 |
| 835,371 | 11/1906 | Smith | 172—548 |
| 2,677,362 | 5/1954 | Back | 30—307 X |

FOREIGN PATENTS 1,368,813  8/1952  Sweden.

LUCIE H. LAUDENSLAGER, Primary Examiner

U.S. Cl. X.R.

30—306